2 Sheets—Sheet 2.

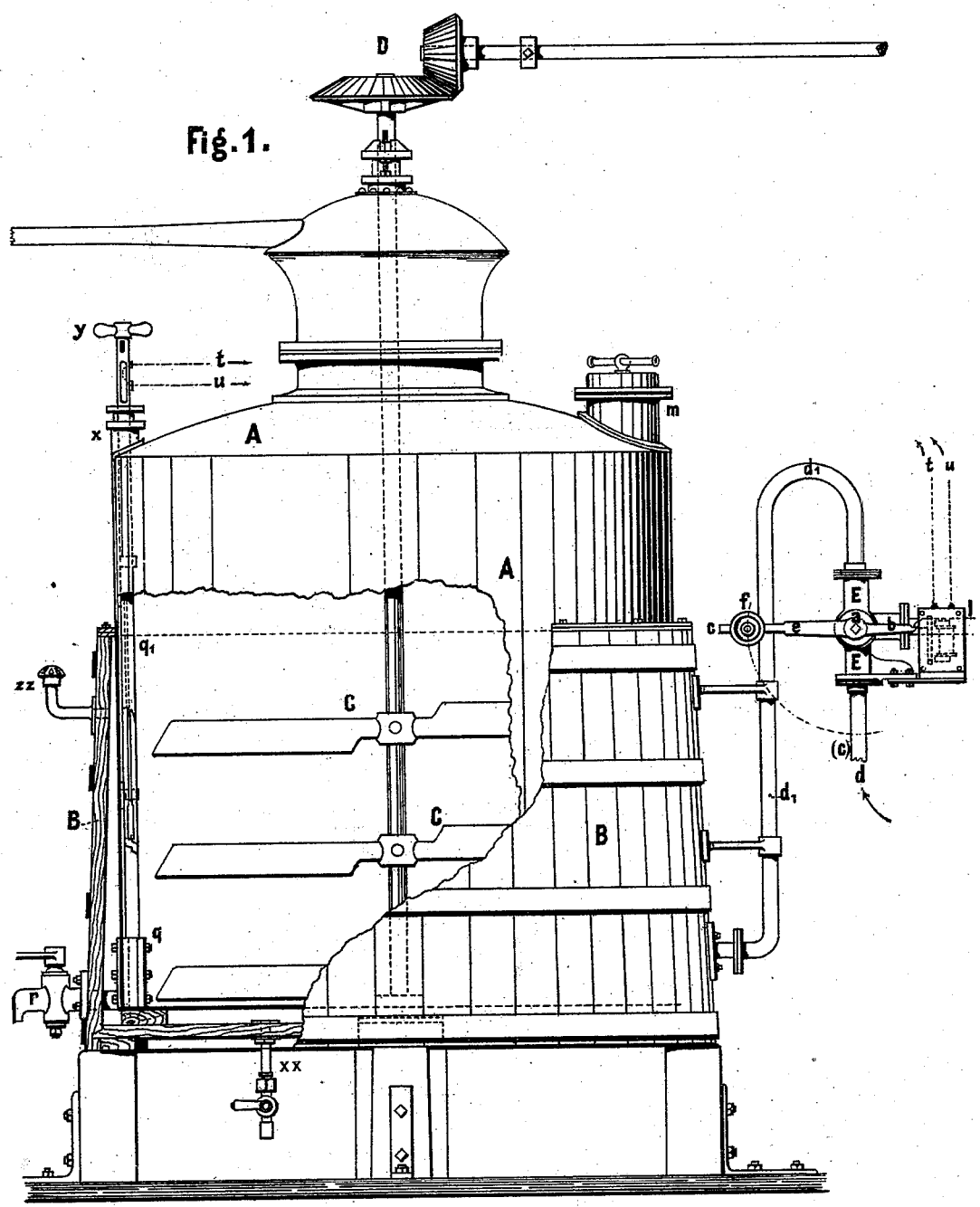

J. WERNER.
Apparatus for Boiling Varnish, Lacquer, &c.

No. 225,032. Patented Mar. 2, 1880.

Attest,
Geo. H. Graham
A. Scott

Inventor,
John Werner.
by Munson & Philipp
Attys.

N. PETERS, PHOTO-LITHOGRAPHER, WASHINGTON, D. C.

UNITED STATES PATENT OFFICE.

JOHN WERNER, OF MANNHEIM, BADEN.

APPARATUS FOR BOILING VARNISH, LACQUER, &c.

SPECIFICATION forming part of Letters Patent No. 225,032, dated March 2, 1880.

Application filed March 1, 1879.

*To all whom it may concern:*

Be it known that I, JNO. WERNER, of Mannheim, in the Grand Duchy of Baden, have invented certain Improvements in Apparatus for Boiling Varnish, Lacquer, and similar substances, of which the following is a specification.

This invention relates to certain improvements in apparatus for the manufacture of varnish and lacquer, which improvements are applicable to vessels for heating other liquids.

When for the purpose of producing varnish or lacquer a gum or resin is dissolved in alcohol or other solvent at an elevated temperature the liquid is apt to foam up, whereby a loss of material and considerable inconvenience may be caused. It is therefore necessary to keep the temperature within certain limits; and for this purpose it is advantageous to have an automatic apparatus by which any further supply of the heating medium, such as steam or hot air, is prevented as soon as the highest admissible temperature has been attained.

Figure 3:
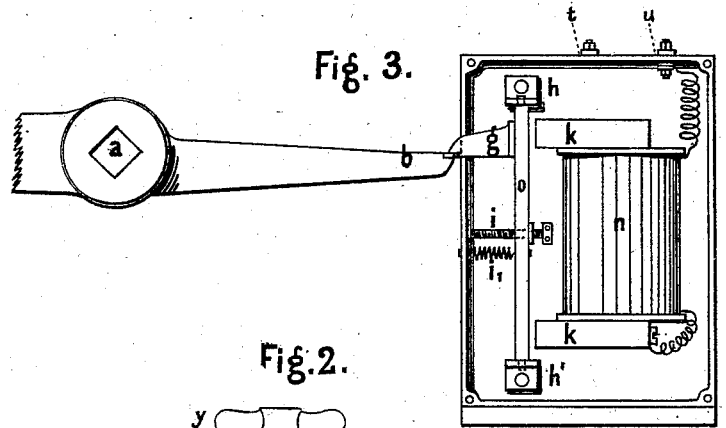
Figure 2:
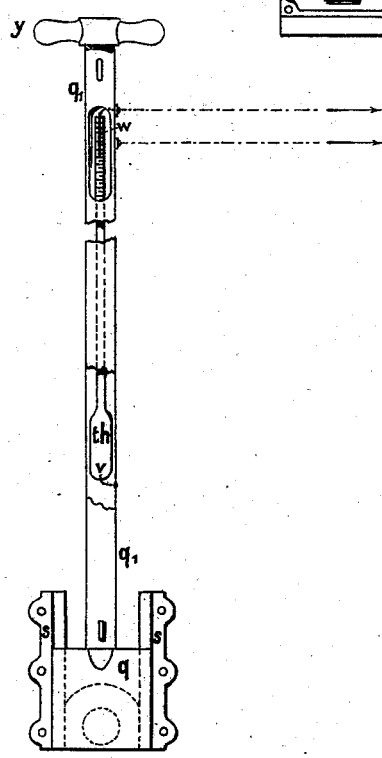

On the accompanying two sheets of drawings a vessel adapted for the manufacture of varnish and provided with such apparatus is represented, Figure 1 being a general view, and Figs. 2 and 3 details.

The vessel or boiler A, which is or may be entirely closed, is surrounded upon its lower part by a casing, B, which may be constructed of wood, and which is made tight against the sides of A at the top. This casing thus constitutes a steam-jacket around the sides and under the bottom of the said vessel.

$d\ d'$ is the steam-supply pipe; $m$, an aperture for filling in the material; and C, a rotating stirring apparatus, driven by the bevel-wheels D or otherwise. $r$ is a discharge-cock; $x\ x$, a drain-cock, and $z\ z$ an air-valve.

Within the vessel A a thermometer is inclosed in a metallic tube, $q'$, Figs. 1 and 2, which passes through a stuffing-box, $x$, on the cover of the vessel A. This tube has a slit near its top, through which the upper end of the thermometer and its scale may be seen. Into the bulb $th$ of the thermometer one end of a platinum wire, $v$, is sealed, so as to project into the mercury, while its other end is soldered to the tube $q'$. A second platinum wire, $w$, is introduced into the thermometer from above through a stopper, which closes the same at the top, the wire being so adjusted that its end is even with the point of the scale which corresponds to the desired temperature. The latter wire is connected with the conducting-wire $t$, and the tube $q'$ with the conducting-wire $u$ of the coil $n$ of an electro-magnet, $k$, Fig. 3, provided with suitable galvanic battery.

The temperature of the liquid outside of the tube $q'$ varying but slowly, the thermometer will always very nearly show the temperature of the liquid; but if this should not be deemed sufficient the tube may be perforated near the bulb of the thermometer.

It is evident that whenever the temperature which is not to be surpassed has been attained the mercury will come into contact with the upper platinum wire, $w$, thereby causing the galvanic current to be closed, and consequently the armature of the electro-magnet to be attracted. This motion of the armature I make use of for stopping the passage of steam, &c., to the steam-jacket of the vessel A. For this purpose the steam-supply pipe $d\ d'$ is fitted with a cock, E, the plug $a$ of which, in one position, allows the steam to pass from the generator (which is not shown in the drawings) into the jacket of A, while, when turned by a right angle, it cuts it off. To the plug $a$ a double-branched lever $e\ b$ is fixed, the branch $e$ being provided with a weight, $f$, which causes the lever, when not prevented, to assume a vertical position, whereby the cock E is closed. As long, however, as the cock, and consequently the steam-passage, is to be open, the lever is kept in a horizontal position by a beak, $g$, on the armature $o$ of the electro-magnet. This armature, which in Fig. 3 is to be seen from its edge only, is pivoted at $h$ and $h'$.

$i'$ is a spring, which draws the armature away from the magnet $k$, while the screw $i$ limits its motion.

When the temperature of the contents of the vessel A has arrived at the point fixed as maximum the galvanic circuit is closed by the mercury in the thermometer coming in contact with the wire $w$, the electro-magnet attracts its armature, and the lever $e\ b$ is liberated, and consequently tilts, so as to cause the plug $a$ of the cock E to turn by a quarter of a circle, and to cut off the steam.

When the steam-generator has the object of supplying steam for the described purpose only, or under other circumstances, it may be preferred to use a three-way cock, E, as shown in the drawings. When the lever $e\,b$ of this cock is in a vertical position the steam is conducted from the supply-pipe $d$ into a waste-steam pipe, $l$.

Instead of the cock E, a valve or a combination of two valves may be applied, which are suitably acted upon by the lever $e\,b$.

The described self-acting heat-controlling apparatus may also be used in case other liquids are to be heated to a certain limited temperature, as in breweries, distilleries, &c. Moreover, it is to be observed that it may be applied equally well whether the steam, &c., be admitted into a steam-jacket or directly into the liquid contained in the vessel A.

Hitherto powdered glass has frequently been added to the mixture of gum or resin and alcohol, as the same facilitates the solution of the former; but if the stirring apparatus shown in the drawings is applied the temperature throughout the contents of the vessel is equalized, the pieces of gum are prevented from clogging together, and their solution is promoted without the said use of glass.

For the purpose of preventing a loss of material from an accidental opening of the discharge-cock of the vessel A, I provide this cock, on the inside, with a slide or sluice-valve, $q$, Figs. 1 and 2, moving in guides $s\,s$, and fitted with a rod passing upward through the cover of the vessel.

Instead of using a special rod, the above-described metallic tube $q'$, in which the thermometer is inclosed, may be attached to the slide for the same purpose. $y$ is a handle attached to this tube for raising the slide.

I claim as my invention—

The combination, with the vessel A and its jacket B, of a thermometer inclosed in a tube, $q'$, and provided with wires $v$ and $w$, connected with the coil $n$ of an electro-magnet, and the armature $o$, beak $g$, weighted lever $e\,b$, cock E, and supply-pipe $d\,d'$, all substantially as described.

In testimony whereof I have signed my name to this specification in the presence of two subscribing witnesses.

JNO. WERNER.

Witnesses:
 THEODOR LINDENHEIM,
 FRANZ ENGLERT.